United States Patent [19]

Stark, Jr. et al.

[11] 4,200,846

[45] Apr. 29, 1980

[54] EFFICIENT LASER AMPLIFIER USING SEQUENTIAL PULSES OF DIFFERENT WAVELENGTHS

[75] Inventors: Eugene E. Stark, Jr.; John F. Kephart; Wallace T. Leland; Walter H. Reichelt, all of Los Alamos, N. Mex.

[73] Assignee: The United States of America as represented by the United States Department of Energy, Washington, D.C.

[21] Appl. No.: 838,011

[22] Filed: Sep. 29, 1977

[51] Int. Cl.² ........................ H01S 3/06; H01S 3/101
[52] U.S. Cl. .................. 331/94.5 R; 330/4.3; 331/94.5 C; 331/94.5 G; 331/94.5 P; 331/94.5 M

[58] Field of Search ............... 330/4.3; 331/94.5 C, 331/94.5 P, 94.5 PE, 94.5 G

[56] References Cited

U.S. PATENT DOCUMENTS

| | | | |
|---|---|---|---|
| 3,922,618 | 11/1975 | Javan | 331/94.5 G |
| 4,019,151 | 4/1977 | Bruickner et al. | 331/94.5 R |
| 4,060,769 | 11/1977 | Mallozzi et al. | 330/4.3 |
| 4,093,924 | 6/1978 | Farcy | 331/94.5 C |

*Primary Examiner*—William D. Larkins
*Attorney, Agent, or Firm*—R. V. Lupo; Paul D. Gaetjens; Jerome B. Rockwood

[57] ABSTRACT

A laser oscillator output pulse is separated into a plurality of separate beams which are temporally or spatially individually amplified by a power amplifier. The beams may then be recombined to provide a more powerful output than conventional single beam amplification.

1 Claim, 4 Drawing Figures

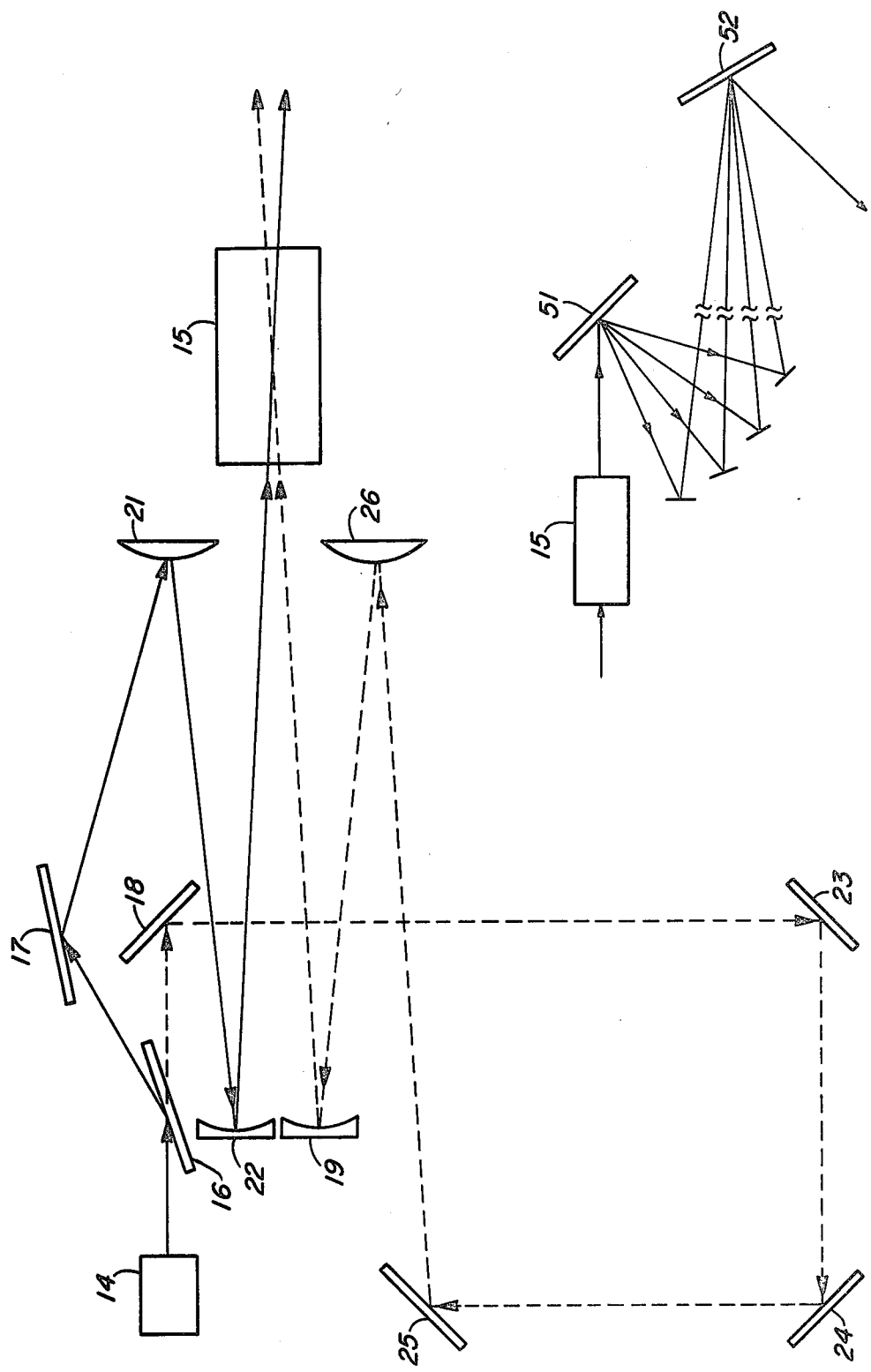

EFFICIENT LASER AMPLIFIER USING SEQUENTIAL PULSES OF DIFFERENT WAVELENGTHS

BACKGROUND OF THE INVENTION

The present invention relates to laser amplifiers, and more particularly to more efficient energy extraction from laser power amplifiers.

High powered gas lasers have many uses, such as isotope separation research and fusion research. While in general gas lasers are more efficient than other varieties of lasers, such as those employing glass lasing mediums, there is still a great deal of room for improvement in the efficiency of gas laser amplifiers. Exemplarily amplifier gain lasts much longer than the duration of the typical pulse required for isotope separation or fusion. It will be apparent, therefore, that taking advantage of the extra duration of amplifier gain to increase the power output does not increase power input to the laser amplifier, and therefore increases the efficiency considerably.

In many laser systems there is an inherent limitation on a rate at which energy can be extracted. Exemplarily, in $CO_2$ lasers, excitation of the molecules of $CO_2$ takes from several tenths of a microsecond to several microseconds, depending on pressure. However, the energy extraction from the upper laser level to the lower laser level in a $CO_2$ laser is very fast, on the order of tens to hundreds of picoseconds while the $CO_2$ molecules descend from the lower laser level in approximately six nanoseconds. For laser isotope separation and laser fusion power, a laser pulse on the order of 0.5 nsec is desired. By passing a plurality of pulses through the laser power amplifier, it is possible to reestablish gain in the gas between pulses by allowing molecules to reach the upper laser level and to decay from the lower laser level. The excitation phase can be made faster by employing a higher voltage discharge. However, more energy is consumed, making the process much less efficient. Similarly, the time required by the excited molecules to reach the upper laser level could be made faster by using higher pressures in the gas. However, higher pressure gases incur optically induced breakdown at intensities required for efficient energy extraction, and is still significantly inadequate for efficient energy extraction.

SUMMARY OF THE INVENTION

In accordance with the present invention, there is provided laser apparatus while splits the pulsed beam from the laser oscillator into a number of separate beams which are amplified at different times by the laser power amplifier. The beams may then be recombined to provide a high powered output beam.

BRIEF DESCRIPTION OF THE DRAWINGS

FIG. 2 illustrates one embodiment of the power amplifier arrangement of the present invention.

FIG. 4 illustrates a third embodiment of the present invention.

DESCRIPTION OF THE PREFERRED EMBODIMENTS

Figure 1:
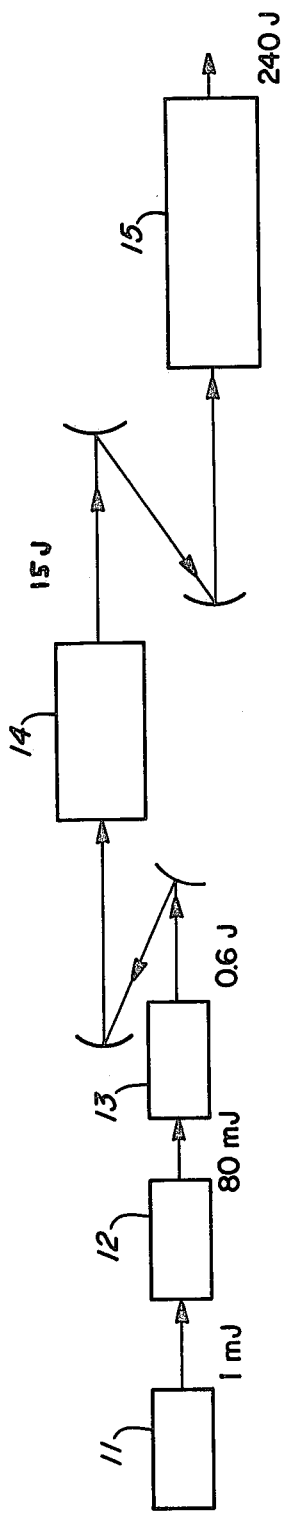
FIG. 1 illustrates the master oscillator power amplifier illustrating the present state of the art.

Referring now to FIG. 1, a typical master oscillator power amplifier laser chain is illustrated. Exemplarily, oscillator 11 is a $CO_2$ laser putting out a 1.2 nsec duration pulse at 10.6 $\mu$m. The pulse is amplified through a chain of four electron-beam-controlled $CO_2$ amplifiers, 12, 13, 14, and 15. Typically, the power output of the oscillator is one mJ, amplifier 12 80 mJ, amplifier 13 0.6 J, amplifier 14 15 J, and amplifier 15 240 J. In the present invention, power amplifier stage 15 is modified in accordance with the present invention as illustrated in FIG. 2. The 15 J nsec pulse output from amplifier stage 14 is split into two pulses by beam splitter 16. Beam splitter 16 is set at an angle approximately 63° from normal and is conveniently fabricated from sodium chloride in a manner well known to those skilled in the laser art. The path of the 5 J pulse is illustrated as a solid line, being reflected by mirrors 17, 21, and 22, to the input side of power amplifier 15. The path of the 10 J pulse is illustrated as a dashed line and is reflected along the path by mirrors 18, 23, 24, 25, 26 and 19 to the input side of power amplifier 15. The 5 J pulse is beam expanded and amplified in amplifier stage 15 to provide an energy output of 167.5 J. The 10 J pulse traverses a considerably longer path as is clearly apparent from FIG. 2 so that it is beam expanded and amplified in amplifier stage 15 approximately 100 nsec after the 5 J pulse is amplified. This yields an energy output of approximately 149 J in a nanosecond pulse. Thus, the total pulse output of the amplifier chain is increased to 316 J or about 32% above the conventional chain arrangement illustrated in FIG. 1. To enable steering of the two beams through power amplifier 15, the two pulses go through amplifier 15 at different angles. Thus the first pulse can be delayed by 100 nsec and the two pulses put onto a target simultaneously.

It will then be apparent in this arrangement that more energy has been extracted from power amplifier 15, increasing the efficiency of the system by 32%. The two pulses further may be employed independently. They may be applied simultaneously onto a target having the same effect as a single pulse of the same total energy, or they may be used independently for two or more separate applications.

Figure 3:
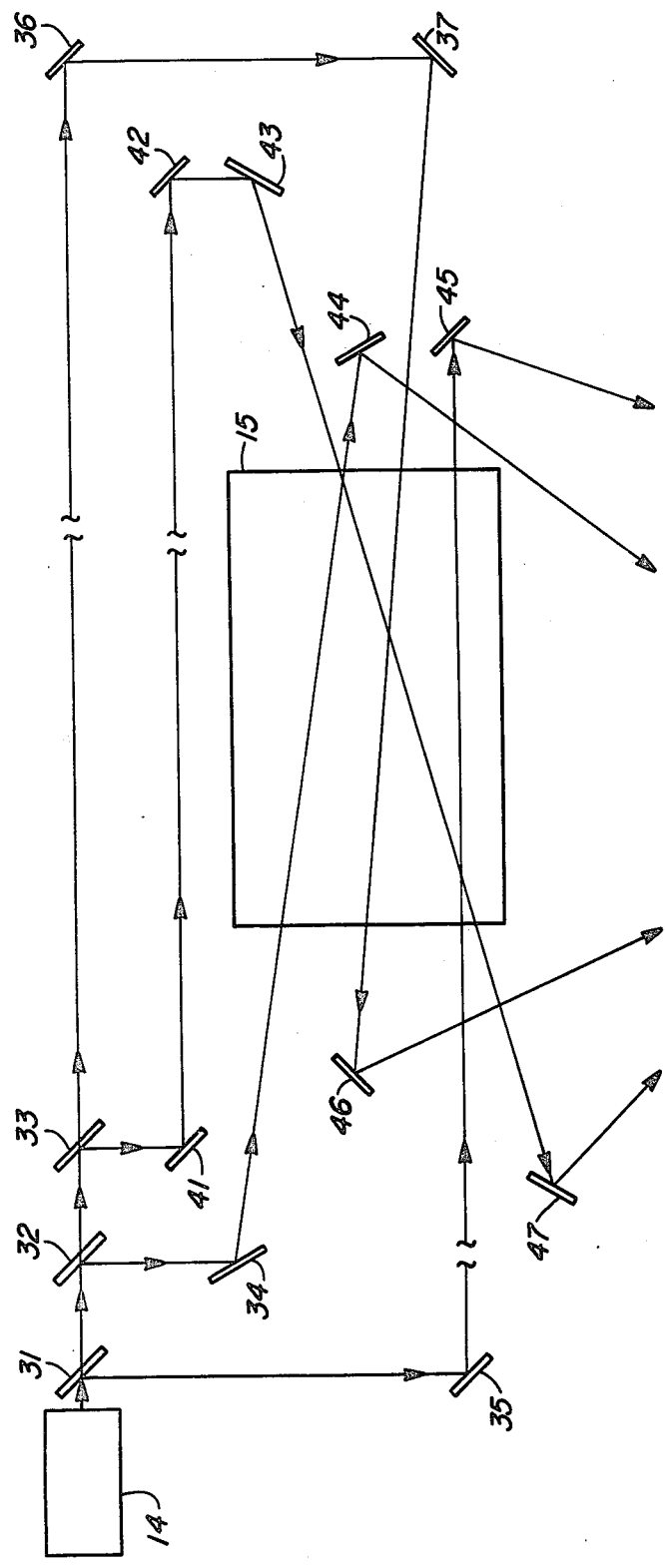
FIG. 3 illustrates a second embodiment of the power amplifier of the present invention.

Referring now to FIG. 3, the second embodiment is illustrated wherein essentially the full amplifier cross section is employed to amplify the output pulse from amplifier 14. A group of beam splitters 31, 32, and 33 are employed to divide the output from amplifier 14 into four separate beams. Conveniently, the beam reflected by beam splitter 32 and mirror 34 is applied to amplifier 15 and is taken as unity delay. The beam reflected by beam splitter 31 to mirror 35 is delayed by 100 nsec from the reference beam furnished by beam splitter 32. The delayed beam is also passed through amplifier 15 from left to right at a different section of the amplifier. Conveniently, the beam passed through all three beam splitters is temporally delayed by an amount 200 nsec reflected by mirrors 36 and 37 and passed through amplifier 15 from right to left in the drawing. The third delayed beam is reflected by beam splitter 33 and reflected by mirrors 41, 42, and 43, being applied to amplifier 15 from the right side in FIG. 3. It will be noted that the direct beam and the short delay beam pass through the amplifier from left to right, while the two longer delays pass through the amplifier from right to left. All four pulses are aimed conveniently at a suitable target, either the same or different targets. The direct beam is reflected by mirror 44, the first delay beam by mirror 45, the second delay beam by mirror 46, and the third delay beam by mirror 47. The variously delayed pulses extract energy from the amplifier more effectively at the end of their amplification rather than at the beginning, since the pulses in the amplifier are more intense at the end of their individual amplification period, thereby more efficiently using the entire length of the power amplifier.

The third embodiment of the present invention is illustrated in FIG. 4. Instead of angular separation of the pulses as in the previous embodiments, separation is done here by employing a grating and varying the frequency components of successive pulses. $CO_2$ lasers can operate on a number of discrete frequencies between approximately 9.2 $\mu$m and 10.8 $\mu$m. The oscillator in this embodiment is adapted to produce a train of pulses each at a different frequency in the $CO_2$ frequency band. Exemplarily, several $CO_2$ lasers, each operating at a different output frequency by the use of an intracavity grating may be employed, producing short pulses which are delayed and combined using beam splitters to produce this pulse train. The pulse train is amplified as by amplifiers 12, 13, 14, and 15 as in the previously disclosed embodiments. After amplification the pulses are reflected off a large ruled grating 51. Such a ruled diffraction grating has the property that light pulses of different frequencies are reflected at different angles. This reflection causes a spatial separation of pulses permitting them to be used simultaneously by employing optical delays. Alternatively, the pulses may be recombined into a single short pulse by employing optical delays and the second grating 52.

While the invention has been particularly shown and described with reference to the preferred embodiments thereof, it will be understood by those skilled in the art that various changes in form and details may be made therein without departing from the spirit and scope of the invention.

What I claim is:

1. A laser power amplifying device comprising:
a laser oscillator generating a pulse train having a plurality of discrete frequencies;
laser power amplifier means for amplifying said pulse train;
frequency splitting means for separating each of said discrete frequencies into an individual beam;
delay means in each of said beams; and,
combining means for combining said delayed beams into a single pulse.

* * * * *